(12) United States Patent
Kamo et al.

(10) Patent No.: US 11,768,608 B2
(45) Date of Patent: Sep. 26, 2023

(54) COMPUTER SYSTEM, COMPUTE NODE, AND DATA MANAGEMENT METHOD

(71) Applicant: Hitachi, Ltd., Tokyo (JP)

(72) Inventors: Yuto Kamo, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 17 days.

(21) Appl. No.: 17/694,912

(22) Filed: Mar. 15, 2022

(65) Prior Publication Data

US 2023/0109600 A1 Apr. 6, 2023

(30) Foreign Application Priority Data

Sep. 29, 2021 (JP) .................................. 2021-159940

(51) Int. Cl.
*G06F 3/06* (2006.01)
*G06F 16/27* (2019.01)

(52) U.S. Cl.
CPC ............ *G06F 3/0619* (2013.01); *G06F 3/0608* (2013.01); *G06F 3/0641* (2013.01); *G06F 3/0689* (2013.01); *G06F 16/27* (2019.01)

(58) Field of Classification Search
None
See application file for complete search history.

(56) References Cited

U.S. PATENT DOCUMENTS

| | | | |
|---|---|---|---|
| 2014/0181034 A1* | 6/2014 | Harrison et al. ..... | G06F 11/1469 707/646 |
| 2019/0102418 A1* | 4/2019 | Vasudevan et al. . | G06F 16/2365 |
| 2020/0285410 A1* | 9/2020 | George et al. ....... | G06F 3/0665 |
| 2020/0304373 A1 | 9/2020 | Jin. et al. | |
| 2021/0132846 A1* | 5/2021 | Moldvai et al. ..... | G06F 3/0671 |
| 2021/0334241 A1* | 10/2021 | McCarthy et al. ... | G06F 3/0641 |

FOREIGN PATENT DOCUMENTS

JP 2020-154587 A 9/2020

* cited by examiner

*Primary Examiner* — Michael Alsip
(74) *Attorney, Agent, or Firm* — Mattingly & Malur, PC

(57) ABSTRACT

A computer system includes a NoSQL/SQL cluster and a distributed storage. In order to make storage target data redundant, a compute node in the NoSQL/SQL cluster instructs other compute nodes in the NoSQL/SQL cluster to write the storage target data into the distributed storage. As regards a file containing the storage target data, the compute node in the NoSQL/SQL cluster deduplicates data in storage apparatuses of a plurality of storage nodes in the distributed storage. The distributed storage performs erasure coding to store a file of the storage target data newly found to be duplicate in deduplication and to store a file of the storage target data not deduplicated in deduplication.

9 Claims, 9 Drawing Sheets

| FILE ID C21 | OFFSET IN FILE C22 | CHUNK LENGTH C23 | DATA REDUCTION PROCESS COMPLETION FLAG C24 | CHUNK STATE C25 | DUPLICATE CHUNK STORAGE FILE ID C26 | REFERENCE OFFSET C27 |
|---|---|---|---|---|---|---|
| XX | 0 | 5120 | False | UNDUPLICATED | - | - |
|  | 5120 | 4096 | True | DUPLICATED | AA | 0 |
|  | 9216 | 6144 | True | DUPLICATED | AA | 4096 |

FIG.5
T3

| FILE ID C31 | OFFSET C32 | CHUNK LENGTH C33 | REFERENCE COUNT C34 |
|---|---|---|---|
| AA | 0 | 7168 | 2 |
| | ︙ | | |

| FINGERPRINT C41 | FILE ID C42 | OFFSET C43 | CHUNK LENGTH C44 |
|---|---|---|---|
| XXXXXXXX | XX | 0 | 5120 |
| AAAAAAAA | AA | 0 | 7168 |
| YYYYYYYY | XX | 12288 | 8192 |
| ⋮ | | | |

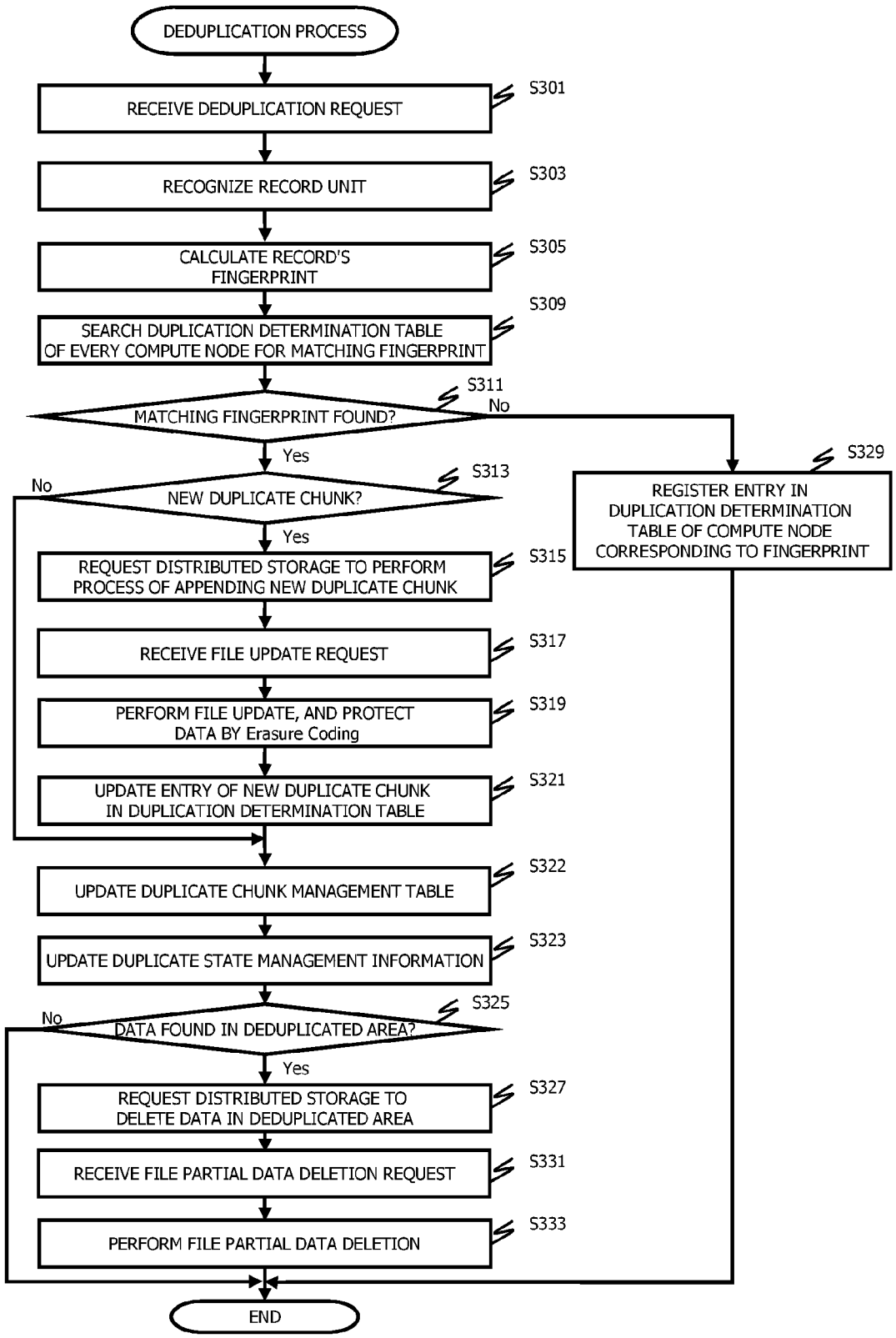

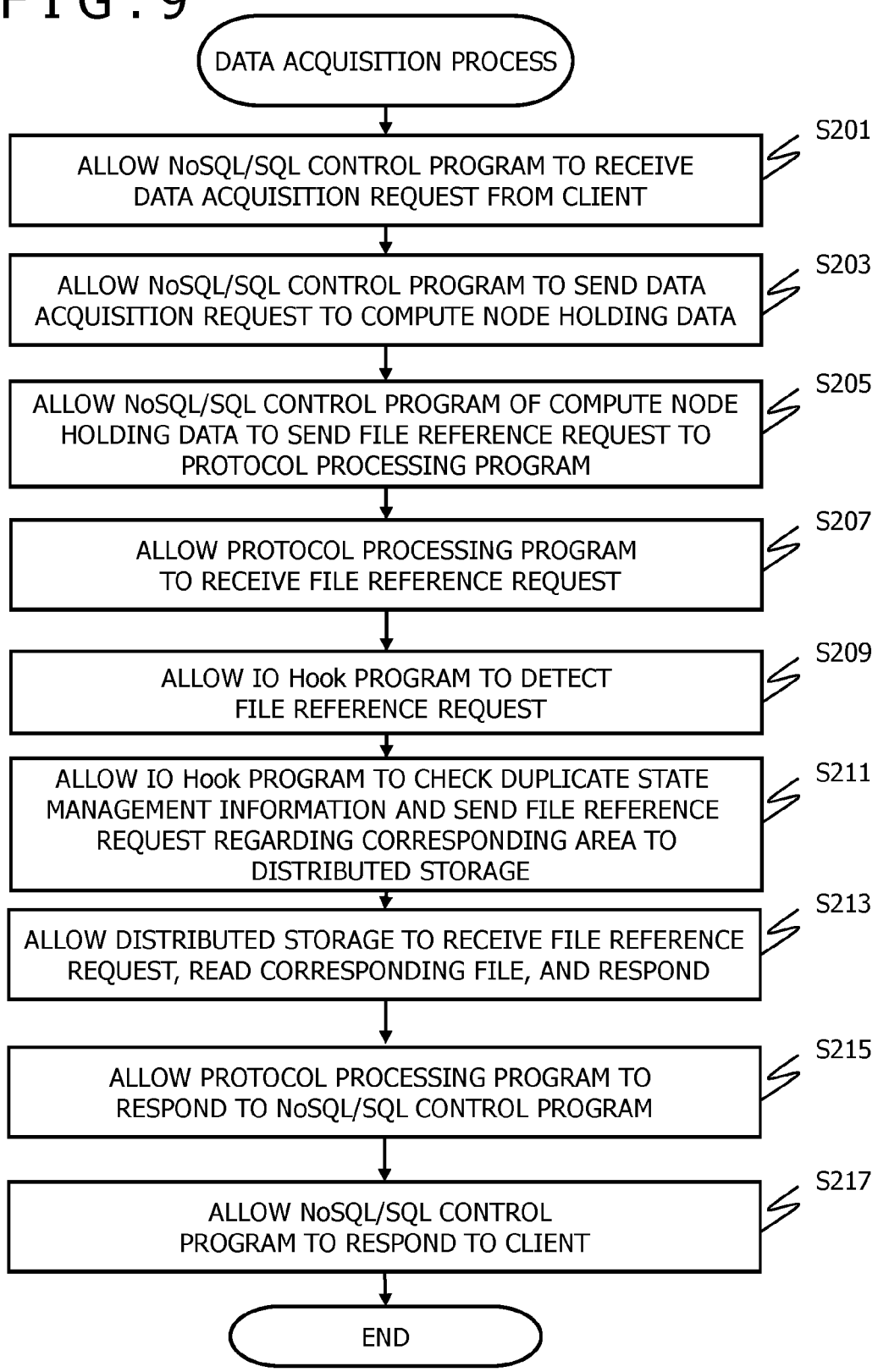

COMPUTER SYSTEM, COMPUTE NODE, AND DATA MANAGEMENT METHOD

CROSS-REFERENCE TO RELATED APPLICATION

The present application claims priority from Japanese Application JP2021-159940, filed on Sep. 29, 2021, the contents of which is hereby incorporated by reference into this application.

BACKGROUND OF THE INVENTION

1. Field of the Invention

The present invention relates to a technology for managing data of a database cluster including a plurality of compute nodes.

2. Description of the Related Art

A Not only SQL (NoSQL)/SQL cluster is known as a database cluster that includes a plurality of nodes capable of scaling out storage capacity and performance.

If a failure occurs in one of the nodes included in the NoSQL/SQL cluster in a case where it is set and operated with no data protection provided, the data of that node is lost.

Meanwhile, the NoSQL/SQL cluster can be set in such a manner as to multiplex (e.g., triplicate) the data for protection purposes. However, in a case where the data is multiplexed as mentioned above for protection purposes, the amount of data storage is increased by multi-fold (threefold when the data is triplicated) of the data to be stored. This decreases the efficiency of data storage.

There is a known technology for addressing such a decrease in the efficiency of data storage. This technology uses a single storage node as a volume for storing multiplexed data in the NoSQL/SQL cluster, applies a deduplication process to that storage node, and then protects the data by erasure coding (refer to JP-2020-154587-A).

SUMMARY OF THE INVENTION

For example, the technology described in Japanese Patent Laid-open No. 2020-154587 performs the deduplication process to effectively reduce the amount of storage target data to be stored in a storage node. However, the multiplexed data is stored in a single storage node. Thus, the single storage node is concentratedly accessed to obtain the same data. Consequently, the single storage node is heavily loaded to become a bottleneck. This may result in the inability to scale out the performance of a database cluster.

The present invention has been made in view of the above circumstances to provide a technology capable of not only reducing the performance degradation of a database cluster but also improving the storage efficiency of managed data.

In order to provide the above-mentioned technology, according to an aspect of the present invention, there is provided a computer system including a plurality of compute nodes and a plurality of storage nodes. The plurality of compute nodes form a database cluster. The plurality of storage nodes form a distributed storage that manages the data of the database cluster. A compute node in the database cluster instructs the plurality of compute nodes in the database cluster to write storage target data into the distributed storage in order to make the storage target data redundant. Upon receipt of the instruction from the database cluster, as regards a data unit including the storage target data designated by the instruction, the compute node deduplicates data in a storage apparatus to be managed by the plurality of storage nodes in the distributed storage. The distributed storage performs erasure coding to store a data unit of the storage target data that includes data newly found to be duplicate in deduplication and a data unit of the storage target data that includes data not deduplicated in deduplication.

The technology provided by the present invention is capable of not only reducing the performance degradation of a database cluster but also improving the storage efficiency of managed data.

BRIEF DESCRIPTION OF THE DRAWINGS

FIG. 4 is a diagram illustrating a configuration of a duplicate state management table according to an embodiment of the present invention;

FIG. 5 is a diagram illustrating a configuration of a duplicate chunk management table according to an embodiment of the present invention;

FIG. 6 is a diagram illustrating a configuration of a duplication determination table according to an embodiment of the present invention;

FIG. 8 is a flowchart illustrating a deduplication process according to an embodiment of the present invention; and FIG. 9 is a flowchart illustrating a data acquisition process according to an embodiment of the present invention.

DESCRIPTION OF THE PREFERRED EMBODIMENT

An embodiment of the present invention will now be described with reference to the accompanying drawings. It should be noted that the embodiment described below is not intended to limit the present invention defined in the appended claims. Further, all elements described in conjunction with the embodiment and their combinations are not necessarily essential to solutions provided by the present invention.

In the following description, information may occasionally be expressed by using the term "AAA table." However, the information may be expressed by using any data structure. That is, the "AAA table" may be referred to as "AAA information" in order to indicate that the information is not dependent on the data structure.

Further, in the following description, the term "processor" may denote one or more processors. At least one processor is typically a microprocessor such as a central processing unit (CPU), but may alternatively be a different type of processor such as a graphics processing unit (GPU). At least one processor may be a single-core processor or a multi-core processor.

Further, in the following description, processing may occasionally be described with a "program" regarded as a main operating subject. However, when executed by a processor (e.g., a CPU), the program performs a predetermined process by appropriately using, for example, a storage section (e.g., a memory) and/or an interface device. Thus, the processor (or an apparatus or system including the processor) may be regarded as the main operating subject of processing. Moreover, the processor may include a hardware circuit that performs a part or whole of the processing. The program may be installed in an apparatus, such as a computer, from a program source. The program source may be, for example, a program distribution server or a computer-readable recording medium (e.g., a portable recording medium). Additionally, in the following description, two or more programs may be implemented as one program, and one program may be implemented as two or more programs.

Further, in the following description, reference signs (or common signs included in the reference signs) may be used in a case where elements of the same type are not distinguished from each other, and identification numbers (or reference signs) of elements may be used in a case where elements of the same type are distinguished from each other.

Figure 1:
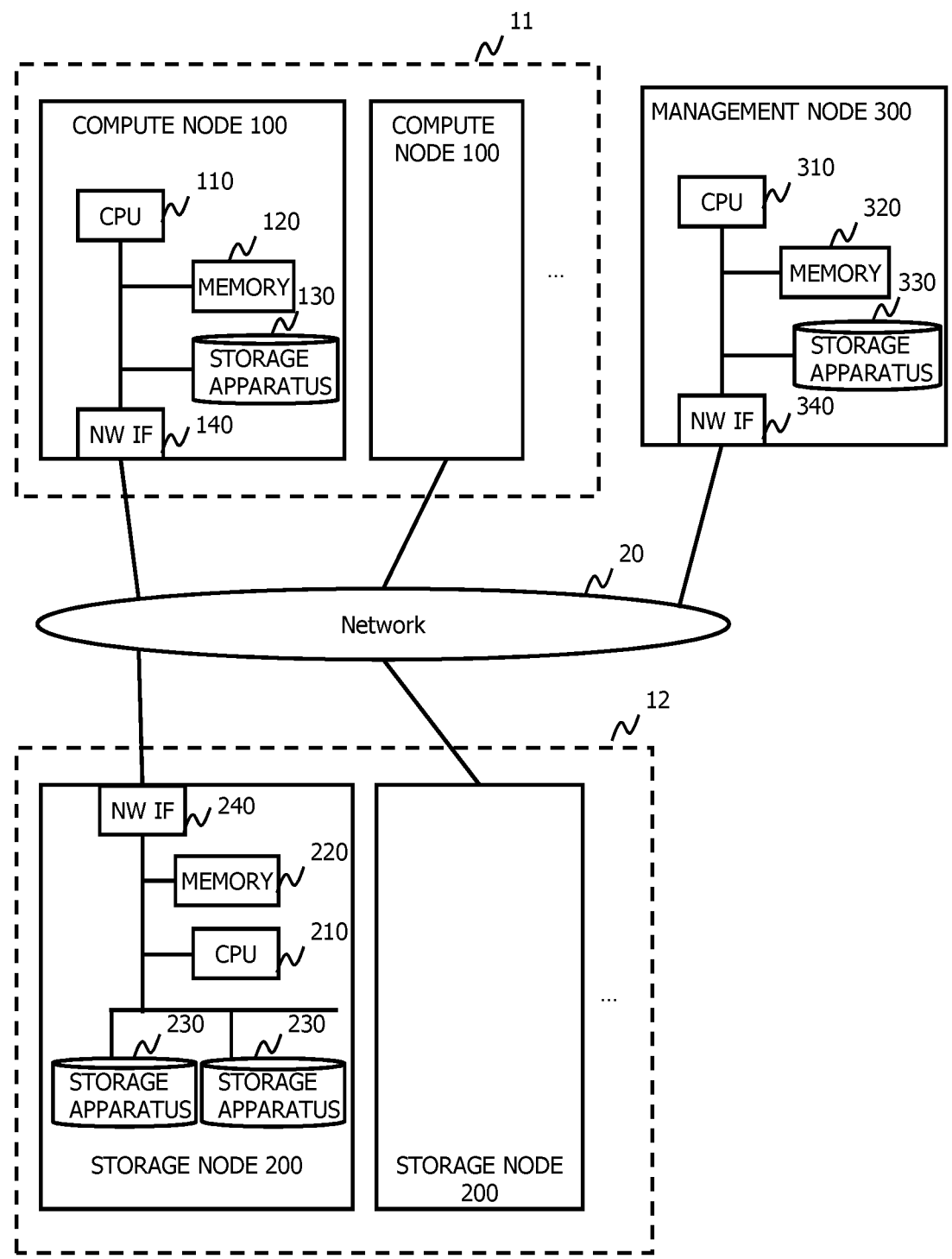
FIG. 1 is a diagram illustrating a configuration of a computer system according to an embodiment of the present invention.

FIG. 1 is a diagram illustrating a configuration of a computer system according to an embodiment of the present invention.

A computer system 10 includes a plurality of compute nodes 100, a plurality of storage nodes 200, and a management node 300. The compute nodes 100, the storage nodes 200, and the management node 300 are connected through a network 20.

The network 20 is, for example, a wide area network (WAN). It should be noted that the network 20 is not limited to a wide area network (WAN) and may be one of various other types of network.

In the present embodiment, as an example of a database cluster, a NoSQL/SQL cluster 11 is formed by the plurality of compute nodes 100. In accordance with a data registration/update request from an unillustrated client, the NoSQL/SQL cluster 11 stores the corresponding data to a distributed storage 12. In accordance with a data acquisition request from the client, the NoSQL/SQL cluster 11 acquires the corresponding data from the distributed storage 12 and sends back the acquired corresponding data to the client. It should be noted that the compute nodes 100 may operate as a client.

Further, in the present embodiment, the distributed storage 12 is formed by the plurality of storage nodes 200. The distributed storage 12 registers/updates a file in accordance with a file registration/update request from the NoSQL/SQL cluster 11. Furthermore, in accordance with a file reference request from the NoSQL/SQL cluster 11, the distributed storage 12 acquires a file and passes the acquired file to the NoSQL/SQL cluster 11.

The management node 300 performs processing for managing the compute nodes 100 and the storage nodes 200.

In the present embodiment, it is assumed as an example that the compute nodes 100 and the storage nodes 200 are formed by separate computers (physical computers). However, one compute node 100 and one storage node 200 may alternatively be formed by a single computer. Further, it is assumed as an example that the distributed storage 12 is formed by the plurality of storage nodes 200. Alternatively, however, the distributed storage 12 need not be formed.

The compute nodes 100 each include a CPU 110, a memory 120, a storage apparatus 130, and a network interface (NW IF) 140. These components are interconnected, for example, by a bus or other communication channel.

The CPU 110 executes programs stored in the memory 120, to perform various processes, such as a process of the NoSQL/SQL cluster 11. The NW IF 140 is an interface that communicates with another apparatus (other compute nodes 100, storage nodes 200, management node 300, and client) through the network 20.

The memory 120 is, for example, a random-access memory (RAM), and used to store programs and information for operating as the NoSQL/SQL cluster 11.

The storage apparatus 130 is, for example, a hard disk or a flash memory, and used to store not only programs to be executed by the compute node 100 but also necessary information.

The storage nodes 200 each include a CPU 210, a memory 220, storage apparatuses 230, and an NW IF 240. These components are interconnected, for example, by a bus or other communication channel.

The CPU 210 executes programs stored in the memory 220, to perform various processes, such as a process of the distributed storage 12. The NW IF 240 is an interface that communicates with another apparatus (compute nodes 100, other storage nodes 200, and management node 300) through the network 20.

The memory 220 is, for example, a RAM, and used to store programs and information for operating as the distributed storage 12.

Each of the storage apparatuses 230 is, for example, a hard disk or a flash memory, and used to store not only programs to be executed by the storage node 200 but also data (user data) managed by the NoSQL/SQL cluster 11 and used by the client. In the example of FIG. 1, the storage node 200 stores the user data managed by the NoSQL/SQL cluster 11 in the storage apparatuses 230 inside the storage node 200. However, the user data may alternatively be stored in an external storage apparatus connected to the storage node 200. In short, the user data should be stored in a storage apparatus managed by the storage node 200.

The management node 300 includes a CPU 310, a memory 320, a storage apparatus 330, and an NW IF 340. These components are interconnected, for example, by a bus or other communication channel.

The CPU 310 executes programs stored in the memory 320, to perform various processes. The NW IF 340 is an interface that communicates with another apparatus (compute nodes 100, storage nodes 200, and client) through the network 20.

The memory 320 is, for example, a RAM, and used to store programs and information for performing sparse processing.

The storage apparatus 330 is, for example, a hard disk or a flash memory, and used to store not only programs to be executed by the management node 300 but also necessary information.

The programs and information stored in the memory 120 of a compute node 100 will now be described.

Figure 2:
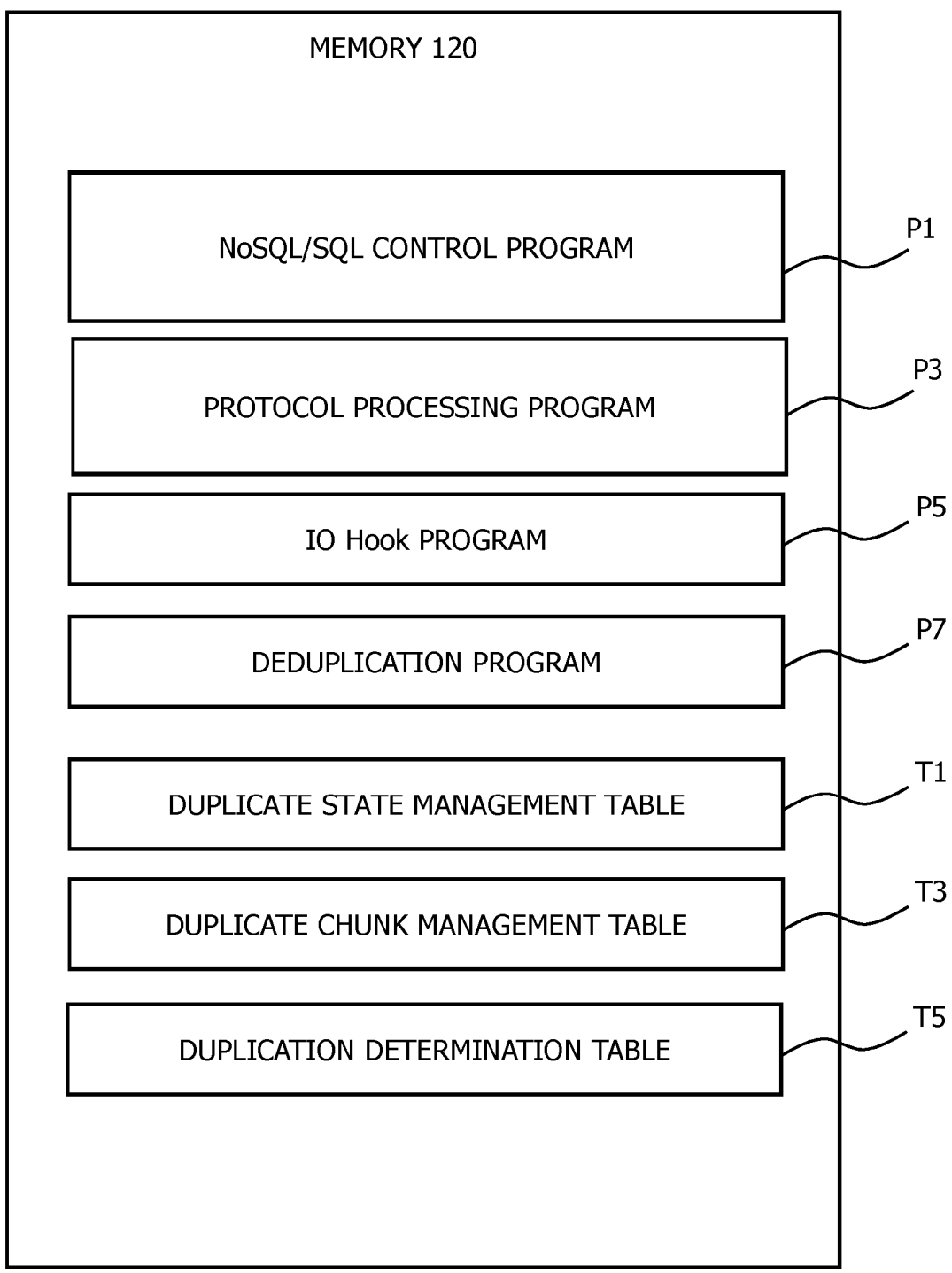
FIG. 2 is a diagram illustrating a configuration of a memory of a compute node according to an embodiment of the present invention.

FIG. 2 is a diagram illustrating a configuration of the memory of the compute node according to an embodiment of the present invention.

The memory 120 stores a NoSQL/SQL control program P1, a protocol processing program P3, an Input/Output (IO) hook program P5, a deduplication program P7, a duplicate state management table T1, a duplicate chunk management table T3, and a duplication determination table T5.

When executed by the CPU 110, the NoSQL/SQL control program P1 configures and controls the NoSQL/SQL cluster 11. The NoSQL/SQL control program P1 collaborates with the NoSQL/SQL control program P1 of another compute node 100 to configure the NoSQL/SQL cluster 11. In the present embodiment, for example, an existing program may be used as the NoSQL/SQL control program P1 without being modified.

When executed by the CPU 110, the protocol processing program P3 receives various requests, such as the file registration/update request and the file reference request, for example, from the NoSQL/SQL control program P1, and processes protocols included in the requests. The protocol processing program P3 processes such protocols as the Native-Client Filesystem in Userspace (FUSE) protocol, the Network File System (NFS) protocol, and the Server Message Block (SMB) protocol.

When executed by the CPU 110, the IO hook program P5 detects an operation performed on a file that is managed by the distributed storage 12 through the protocol processing program P3. Upon detecting a file update request, the IO hook program P5 sends a deduplication instruction to the deduplication program P7. Further, upon detecting a file reference request, the IO hook program P5 sends a file reference instruction to the storage node 200 in accordance with the file reference request.

When executed by the CPU 110, the deduplication program P7 performs a deduplication process on a target file designated by the file update request.

The duplicate state management table T1, the duplicate chunk management table T3, and the duplication determination table T5 will be described later.

The programs stored in the memory 220 of the storage node 200 will now be described.

Figure 3:
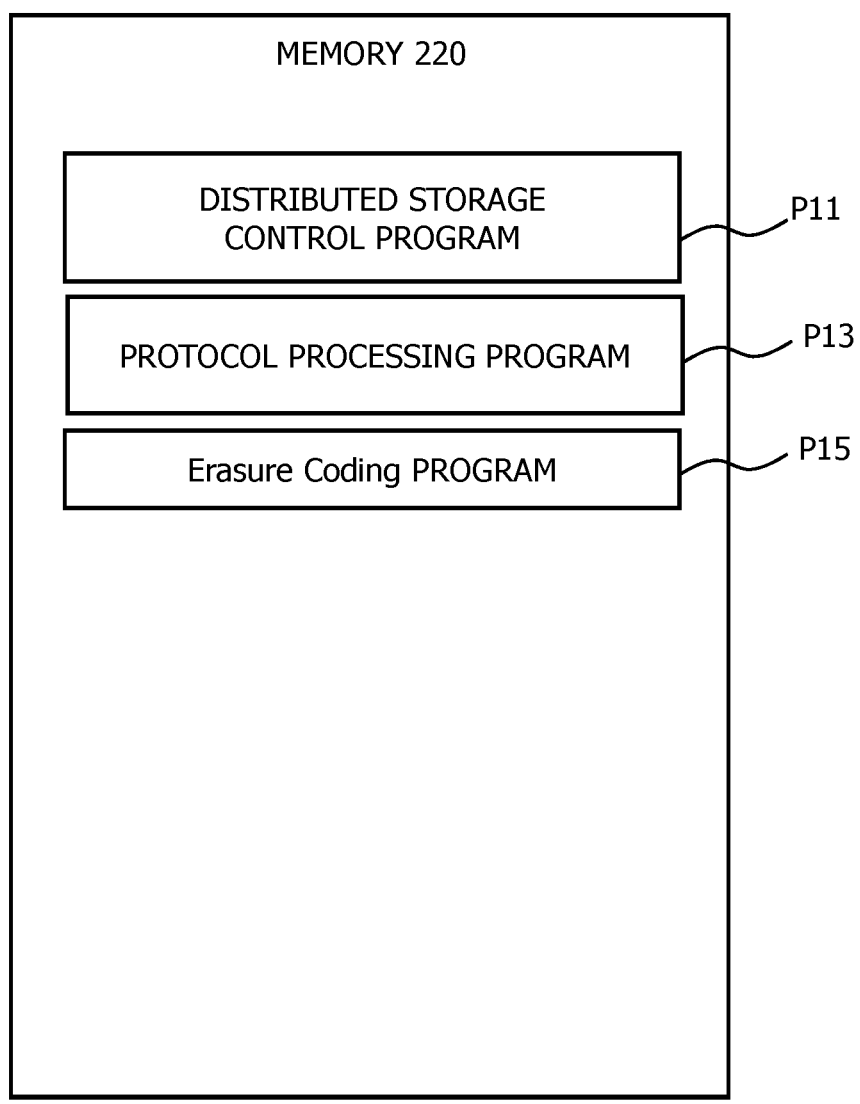
FIG. 3 is a diagram illustrating a configuration of a memory of a storage node according to an embodiment of the present invention.

FIG. 3 is a diagram illustrating a configuration of the memory of the storage node according to an embodiment of the present invention.

The memory 220 stores a distributed storage control program P11, a protocol processing program P13, and an erasure coding program P15.

When executed by the CPU 210, the distributed storage control program P11 provides the distributed storage 12. The distributed storage control program P11 collaborates with the distributed storage control program P11 of other storage nodes 200 to provide the distributed storage 12. The distributed storage 12 may be a file storage for managing a file (an example of a data unit), an object storage for managing an object (an example of a data unit), or a storage for managing both of them.

When executed by the CPU 210, the protocol processing program P13 receives various requests, such as the file registration/update request and the file reference request from the distributed storage control program P11, and processes protocols for the storage apparatuses 230 in accordance with the received requests.

The erasure coding program P15 performs erasure coding on a file to be stored in the distributed storage 12, in order to protect the file. In the present embodiment, erasure coding has redundancy equal to or higher than that of the NoSQL/SQL cluster 11. In erasure coding, for example, the plurality of storage nodes 200 may be used to form a redundant arrays of independent disks (RAID) 6 configuration (e.g., 6D2P configuration).

A configuration of the duplicate state management table T1 will now be described.

FIG. 4 is a diagram illustrating a configuration of the duplicate state management table according to an embodiment of the present invention.

The duplicate state management table T1 manages information regarding deduplication of files managed in the distributed storage 12, and includes an entry of each file. The entry in the duplicate state management table T1 includes fields indicating a file identification (ID) C21, an offset in file C22, a chunk length C23, a data reduction process completion flag C24, a chunk state C25, a duplicate chunk storage file ID C26, and a reference offset C27. It should be noted that the entry for one file ID may include information regarding one or more chunks included in the corresponding file (a set of offset in file C22, chunk length C23, data reduction process completion flag C24, chunk state C25, duplicate chunk storage file ID C26, and reference offset C27).

The field of file ID C21 stores a file identifier (file ID) corresponding to the entry. The field of offset in file C22 stores an offset indicating the first position in file of a chunk included in a file corresponding to the entry. The field of chunk length C23 stores the length of a chunk included in the file corresponding to the entry. The field of data reduction process completion flag C24 stores a flag (data reduction process completion flag) indicating whether or not a data reduction process (the deduplication process in the present embodiment) is already performed on the data of a chunk. False or True is used as the data reduction process completion flag. False indicates that the data reduction process is not yet performed. True indicates that the data reduction process is already performed. The field of chunk state C25 stores the state of a chunk. Duplicated or Unduplicated is used to indicate the chunk state. Duplicated indicates that the data of a chunk is a duplicate of the data in another file. Unduplicated indicates that the data of a chunk is not a duplicate of the data in another file. The field of duplicate chunk storage file ID C26 stores the identifier (file ID, duplicate chunk storage file ID) of a file (duplicate chunk storage file) storing data corresponding to a chunk in a case where the chunk is a duplicate of data in another file. The field of reference offset C27 stores an offset indicating the first position of the data of a chunk in the duplicate chunk storage file.

A configuration of the duplicate chunk management table T3 will now be described.

FIG. 5 is a diagram illustrating a configuration of the duplicate chunk management table according to an embodiment of the present invention.

The duplicate chunk management table T3 manages information regarding duplicate chunk storage files, and includes an entry of each duplicate chunk storage file. The entry in the duplicate chunk management table T3 includes fields indicating a file ID C31, an offset C32, a chunk length C33, and a reference count C34. It should be noted that the entry for one file ID may include information regarding one or more chunks included in the duplicate chunk storage file (a set of offset C32, chunk length C33, and reference count C34).

The field of file ID C31 stores the identifier (file ID, duplicate chunk storage file ID) of a duplicate chunk storage file corresponding to the entry. The field of offset C32 stores an offset indicating the first position in file of a chunk included in a file corresponding to the entry. The field of chunk length C33 stores the length of a chunk included in the file corresponding to the entry. The field of reference count C34 stores the number of chunks in a file referencing the chunks.

A configuration of the duplication determination table T5 will now be described.

FIG. 6 is a diagram illustrating a configuration of the duplication determination table according to an embodiment of the present invention.

The duplication determination table T5 manages information for determining whether units for duplication determination (duplication determination units) are duplicated, and includes an entry of each duplication determination unit. In the present embodiment, records in the NoSQL/SQL cluster 11 are regarded as the duplication determination units. It should be noted that not only the units of one record but also the units of a plurality of records may be regarded as the duplication determination units.

The entry in the duplication determination table T5 includes fields indicating a fingerprint C41, a file ID C42, an offset C43, and a chunk length C44.

The field of fingerprint C41 stores a fingerprint for a duplication determination unit corresponding to the entry. The fingerprint may be a hash value for data in the duplication determination unit. If the length of the duplication determination unit is less than a predetermined length, the fingerprint may be duplication determination unit data itself instead of the hash value. Using the duplication determination unit data itself as the fingerprint eliminates the necessity of calculating the hash value of the duplication determination unit, and hence reduces the processing load. The field of file ID C42 stores the file ID of a file storing a data entity in a duplication determination unit corresponding to the entry. For example, in a case where the duplication determination unit is duplicated, the file ID is a duplicate chunk storage file ID. The field of offset C43 stores an offset indicating the first position in file of a duplication determination unit corresponding to the entry. The field of chunk length C44 stores the length of data in a duplication determination unit corresponding to the entry.

Processing operations in the computer system 10 will now be described.

First, a data registration/update process will be described.

Figure 7:
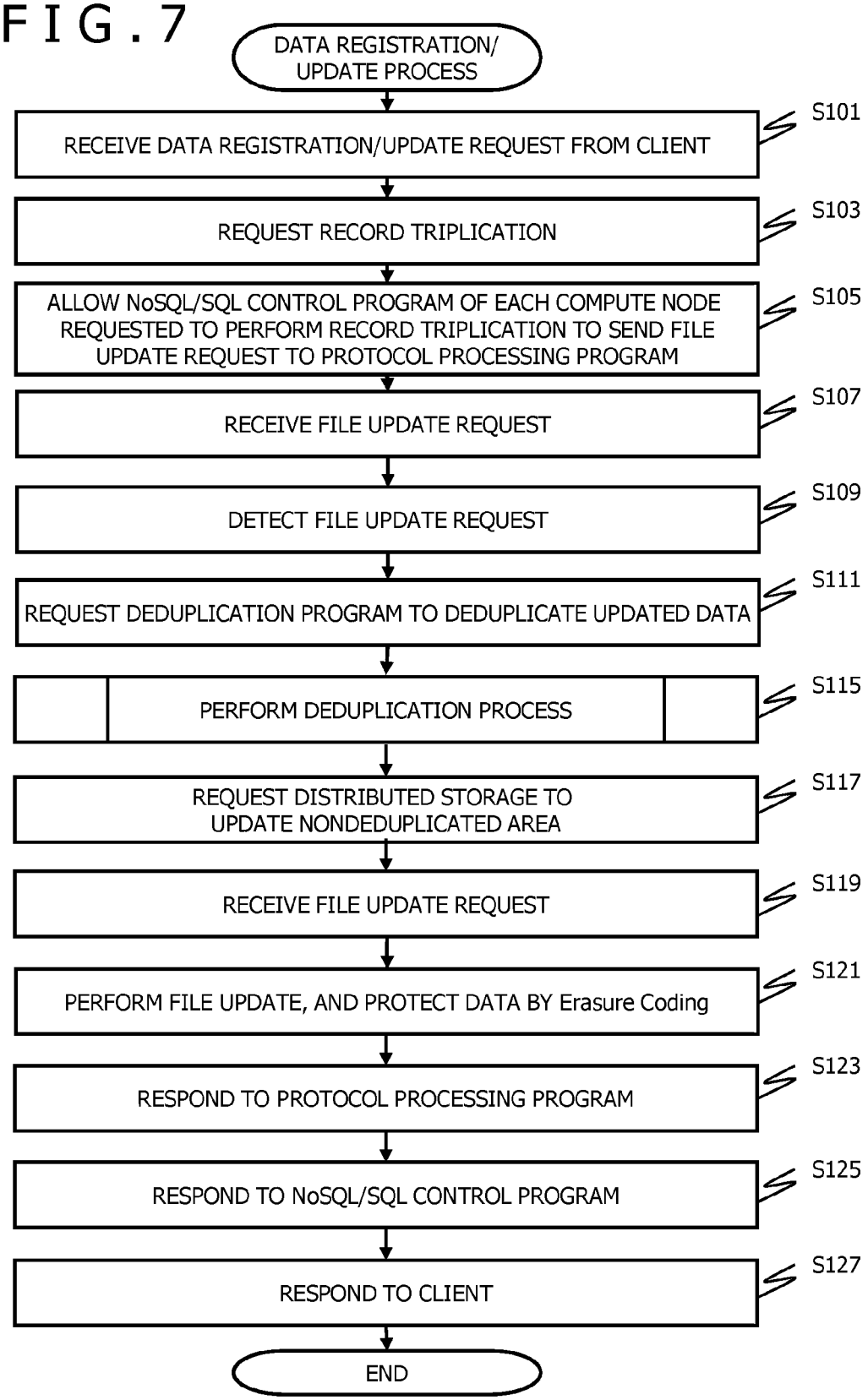
FIG. 7 is a flowchart illustrating a data registration/update process according to an embodiment of the present invention.

FIG. 7 is a flowchart illustrating the data registration/update process according to an embodiment of the present invention.

In the data registration/update process, the NoSQL/SQL control program P1 (in a strict sense, the CPU 110 executing the NoSQL/SQL control program P1) of a compute node 100 receives a data registration/update request transmitted from the client (step S101). Here, the data registration/update request is generated in a case where the client registers data in the NoSQL/SQL cluster 11 or updates data managed in the NoSQL/SQL cluster 11.

The NoSQL/SQL control program P1 requests multiplexing of a record targeted by the data registration/update request (making the record redundant; triplicating the record in the present example) (step S103). More specifically, in accordance with a predetermined algorithm, the NoSQL/SQL control program P1 selects three record-storing compute nodes 100 from among the compute nodes 100 included in the NoSQL/SQL cluster 11, and requests the selected compute nodes 100 to register or update the record. It should be noted that one of the three compute nodes 100 need not have the NoSQL/SQL control program P1 that has received the data registration/update request.

The NoSQL/SQL control program P1 of each compute node 100 requested to register or update the record for triplicating the record requests the protocol processing program P3 to update a file including the record (step S105).

When requested to update the file including the record, the protocol processing program P3 receives the relevant request (file update request) (step S107).

The IO hook program P5 detects that the file update request is sent from the NoSQL/SQL control program P1 to the protocol processing program P3 (step S109).

The IO hook program P5 requests the deduplication program P7 to deduplicate update data in the file that is designated by the file update request (step S111).

Next, the deduplication program P7 performs the deduplication process (see FIG. 8) to deduplicate the update data in the file (step S115).

Then, the protocol processing program P3 requests a storage node 200 of the distributed storage 12 to update an area in the file that is found to be unduplicated in the deduplication process (is not eliminated by the deduplication process) (step S117).

The distributed storage control program P11 of the storage node 200 receives a request (file update request) for updating the area in the file that is not duplicated (step S119).

Next, the distributed storage control program P11 updates the area in the file that is not duplicated, and allows the erasure coding program P15 to perform erasure coding on the data in the updated file and protect (make redundant) the data in the updated file (step S121).

Subsequently, the distributed storage control program P11 transmits a response to the protocol processing program P3 of a requesting compute node 100 in order to indicate the completion of file update (step S123).

Following this, the protocol processing program P3 transmits a response to a requesting NoSQL/SQL control program P1 in order to indicate the completion of file update (step S125).

Then, the NoSQL/SQL control program P1 transmits a response to the requesting client in order to indicate the completion of data registration/update (step S127). Upon completion of step S127, the data registration/update process terminates.

The deduplication process in step S115 will now be described in detail.

FIG. 8 is a flowchart illustrating the deduplication process according to an embodiment of the present invention.

In the deduplication process, the deduplication program P7 of a compute node 100 (in a strict sense, the CPU 110 executing the deduplication program P7) receives a deduplication request regarding the update data in the file from the IO hook program P5 (step S301).

Next, the deduplication program P7 recognizes a record unit in the update target file (step S303). In this instance, the record unit in the file may be recognized by referencing the data in the file to obtain information (delimiter information) indicative of a record delimiter. Here, in a case where the delimiter information regarding a record included in the file is predetermined in a file system, the predetermined delimiter information may be included beforehand in the deduplication program P7 to let the deduplication program P7 recognize the record unit in reference to the predetermined delimiter information. In this case, an alternative is to prepare a setup file for setting the delimiter information, set the delimiter information in the setup file, and allow the deduplication program P7 to reference the setup file and recognize the record unit. Further, the method of recognizing the record unit is not limited to the above ones. For example, another alternative is to register information for recognizing the record unit (information indicative of the location of record) in header information in the file and allow the deduplication program P7 to reference the header information and recognize the record unit. Furthermore, in a case where each record in the file has a fixed length, as regards an area subsequent to the header information in the file, the record unit may be recognized according to the fixed record length.

Subsequently, the deduplication program P7 calculates the fingerprint for each recognized record (step S305). Then, the deduplication program P7 performs subsequent processing (steps S311 and S333) on each recognized record. Each record to be processed will now be referred to as the target record. Further, each record may be referred to as a chunk.

First, the deduplication program P7 references the duplication determination table T5 of each compute node 100 included in the NoSQL/SQL cluster 11, and checks for a fingerprint that matches the fingerprint of the target record, that is, checks for a duplicated chunk (duplicate chunk) (step S309).

If, as a result, any fingerprint is found to match the fingerprint of the target record ("YES" in step S311), the deduplication program P7 determines whether or not the chunk corresponding to the fingerprint is a newly duplicated chunk (new duplicate chunk) (step S313). Whether or not the chunk corresponding to the fingerprint is a new duplicate chunk can be determined by checking whether or not the file ID of a chunk having a matching fingerprint (the file ID indicated in the field of file ID C42) is a file ID indicated in the field of file ID C31 of the duplicate chunk management table T3, that is, an existing file ID.

If, as a result, it is determined that the chunk corresponding to the fingerprint is not a new duplicate chunk ("NO" in step S313), it signifies that data identical with data in the target record is stored in the duplicate chunk storage file. Hence, the deduplication program P7 proceeds to step S322.

Meanwhile, if it is determined that the chunk corresponding to the fingerprint is a new duplicate chunk ("YES" in step S313), the deduplication program P7 transmits a file update request to the distributed storage 12 for appending the new duplicate chunk to the duplicate chunk storage file (step S315).

Next, the distributed storage control program P11 of a storage node 200 included in the distributed storage 12 receives the file update request regarding the duplicate chunk storage file (step S317).

Subsequently, the distributed storage control program P11 updates the duplicate chunk storage file, and allows the erasure coding program P15 to protect duplicate chunk file data by performing erasure coding on the data in the updated duplicate chunk storage file (step S319). This ensures that the data in the new duplicate chunk stored in the duplicate chunk storage file is redundant.

Then, the deduplication program P7 updates information regarding an entry of the new duplicate chunk in the duplication determination table T5 according to the state of new duplicate chunk storage in the duplicate chunk storage file (step S321), and then proceeds to step S322. More specifically, the deduplication program P7 updates the file ID C42 of the entry of the new duplicate chunk and the value of offset C43 to the file ID of the duplicate chunk storage file storing the new duplicate chunk and the offset in that file.

In step S322, the deduplication program P7 updates the duplicate chunk management table T3. More specifically, in a case where the chunk corresponding to the fingerprint is a new duplicate chunk, the deduplication program P7 adds information (a set of offset C32, chunk length C33, and reference count C34) corresponding to the new duplicate chunk to an entry corresponding to the duplicate chunk storage file to which the new duplicate chunk is appended. Meanwhile, in a case where the chunk corresponding to the fingerprint is not a new duplicate chunk, the deduplication program P7 adds 1 to the value of reference count C34 corresponding to a duplicate chunk.

Next, the deduplication program P7 updates the duplicate state management table T1. More specifically, the deduplication program P7 updates the value of data reduction process completion flag C24 corresponding to the target record to True, updates the value of chunk state C25 to Duplicated, updates the value of duplicate chunk storage file ID C26 to the ID of a duplicate chunk storage file storing a duplicate chunk having a fingerprint matching the fingerprint of the target record, and updates the value of reference offset C27 to the offset of data matching the data in the target file in the duplicate chunk storage file (step S323).

Then, the deduplication program P7 determines whether or not there is data in a deduplicated area in a file of the target record (step S325). In this instance, the deduplicated area is an area where data of an existing record is stored in a case where the target record updates the existing record.

If, as a result, it is determined that there is no data in the deduplicated area ("NO" in step S325), it signifies that the target record is newly added data, and that a data area of the existing record need not be deleted. Hence, the deduplication program P7 terminates the deduplication process. Meanwhile, if it is determined that there is data in the deduplicated area ("YES" in step S325), it signifies that the target record is updated data. Hence, in order to provide an enlarged storage area by deleting the data area of the existing record, the deduplication program P7 sends a partial data deletion request to the distributed storage 12 in order to request deletion of the data in the deduplicated area (step S327), and then proceeds to step S331.

In step S331, the distributed storage control program P11 of a storage node 200 included in the distributed storage 12 receives the partial data deletion request. Next, the distributed storage control program P11 deletes partial data in the file that corresponds to the partial data deletion request (step S333). Upon completion of step S33, the deduplication process terminates.

Meanwhile, if no fingerprint is found to match the fingerprint of the target record ("NO" in step S311), it signifies that the stored data is not identical with the target record (is not a duplicate of the target record). Hence, the deduplication program P7 registers an entry of the target record in the duplication determination table T5 of a predetermined compute node 100 (e.g., a compute node 100 predetermined to be managed according to the value of the fingerprint) (step S329), and then terminates the deduplication process.

Here, in a case where, for example, a record is triplicated and stored in a file in the NoSQL/SQL cluster 11, the resulting duplicates of the record in files of compute nodes 100 managing the record may be disposed in an order that varies from one file to another. In the above-described deduplication process, deduplication is performed on an individual record basis. Hence, even if the duplicates of the record in the files are disposed in an order that varies from one file to another, deduplication is properly performed.

Further, in the above-described deduplication process, deduplication can be performed between pieces of data of the plurality of storage nodes 200 included in the distributed storage 12. Hence, individual files need not be placed altogether in the same storage node 200. This makes it possible to reduce the load on the storage nodes 200 and properly scale out the performance of the NoSQL/SQL cluster 11.

A data acquisition process will now be described.

FIG. 9 is a flowchart illustrating the data acquisition process according to an embodiment of the present invention.

In the data acquisition process, the NoSQL/SQL control program P1 of a compute node 100 (in a strict sense, the CPU 110 executing the NoSQL/SQL control program P1) receives a data acquisition request transmitted from the client (step S201). Here, the data acquisition request is generated in a case where the client acquires data from the NoSQL/SQL cluster 11.

In accordance with a predetermined algorithm, the NoSQL/SQL control program P1 checks the compute nodes 100 included in the NoSQL/SQL cluster 11 to identify a compute node 100 holding data in a record, and requests the identified compute node 100 to acquire the data (step S203).

The NoSQL/SQL control program P1 of the compute node 100 that is requested to acquire the data requests the protocol processing program P3 to reference a file containing the record (step S205).

When requested to reference the file containing the record, the protocol processing program P3 receives that request (file reference request) (step S207).

The IO hook program P5 detects that a file reference request is sent from the NoSQL/SQL control program P1 to the protocol processing program P3 (step S209).

The IO hook program P5 references the duplicate state management table T1 to identify an area where data in a file corresponding to the file reference request is stored, and requests a storage node 200 of the distributed storage 12 to reference the file in the identified area (step S211).

The distributed storage control program P11 of the storage node 200 receives the file reference request, reads the file corresponding to the file reference request from a storage apparatus 230, and transmits a response including the read file to the protocol processing program P3 of the requesting compute node 100 (step S213).

Next, the protocol processing program P3 transmits a response regarding file reference to the requesting NoSQL/SQL control program P1 (step S215).

Then, the NoSQL/SQL control program P1 transmits a response regarding data reference to the requesting client (step S217). Upon completion of step S217, the data acquisition process terminates.

The data acquisition process described above enables the client to properly acquire necessary data.

It should be noted that the present invention is not limited to the foregoing embodiment and may be implemented by modifying the foregoing embodiment without departure from the spirit and scope of the present invention.

For example, the foregoing embodiment assumes that the fingerprint for each deduplication unit is calculated in step S305 of the deduplication process. However, the present invention is not limited to such processing. In a case where, for example, the hash value of a record is calculated and registered in the processing performed by the NoSQL/SQL control program P1, the registered hash value may be read and used.

Further, the foregoing embodiment assumes that the deduplication process is performed in synchronization with the data registration/update request from the client. However, the present invention is not limited to such processing. For example, after data corresponding to the data registration/update request is once stored in the distributed storage 12, the deduplication process may be performed on the data stored in the distributed storage 12 at a timing asynchronous with that of the data registration/update request.

What is claimed is:

1. A computer system comprising:
a plurality of compute nodes; and
a plurality of storage nodes,
wherein the plurality of compute nodes form a database cluster, and the plurality of storage nodes form a distributed storage for managing data of the database cluster,
a compute node in the database cluster instructs the plurality of compute nodes in the database cluster to write storage target data into the distributed storage in order to make the storage target data redundant,
upon receipt of the instruction from the database cluster, as regards to a data unit including the storage target data designated by the instruction, the compute node deduplicates data in a storage apparatus to be managed by the plurality of storage nodes in the distributed storage, and
the distributed storage performs erasure coding to store a data unit of the storage target data that includes data newly found to be duplicate in deduplication and a data unit of the storage target data that includes data not deduplicated in deduplication.

2. The computer system according to claim 1,
wherein the erasure coding has redundancy equal to or higher than the redundancy provided by making the data in the database cluster redundant.

3. The computer system according to claim 1,
wherein, upon receipt of the instruction, the compute node identifies a record delimiter in the data units, and performs deduplication by regarding at least one record as a deduplication unit, the deduplication unit being the unit of deduplication.

4. The computer system according to claim 3,
wherein, upon receipt of the instruction, the compute node calculates, in the deduplication, a hash value of the deduplication unit, and performs duplication determination based on the hash value.

5. The computer system according to claim 4,
wherein, if a length of the deduplication unit is equal to or shorter than a predetermined length, upon receipt of the instruction, the compute node performs duplication determination by using a value of the deduplication unit without calculating the hash value of the deduplication unit.

6. The computer system according to claim 1,
wherein one of the plurality of compute nodes and one of the plurality of storage nodes each include a physical computer.

7. The computer system according to claim 1,
wherein the compute node performs the deduplication on the storage target data designated by the instruction before storing the storage target data in the distributed storage.

8. A compute node that forms a database cluster together with other compute nodes and is connected to a distributed storage including a plurality of storage nodes, the compute node comprising:
a processor,
wherein the processor
receives, from a compute node in the database cluster, an instruction for writing storage target data into the distributed storage in order to make the storage target data redundant,
as regards to the storage target data designated by the instruction, deduplicates data in storage apparatuses that are to be managed by the plurality of storage nodes in the distributed storage, and
sends an instruction to the distributed storage configured to store data units by erasure coding, the instruction directing the distributed storage to store a data unit of the storage target data that includes data newly found to be duplicate in deduplication and to store a data unit of the storage target data that includes data not deduplicated in deduplication.

9. A data management method used by a compute node that forms a database cluster together with other compute nodes and is connected to a distributed storage including a plurality of storage nodes, the data management method comprising the steps of:

receiving, from a compute node in the database cluster, an instruction for writing storage target data into the distributed storage in order to make the storage target data redundant;

as regards to the storage target data designated by the instruction, deduplicating data in storage apparatuses that are to be managed by the plurality of storage nodes in the distributed storage; and sending an instruction to the distributed storage configured to store data units by erasure coding, the instruction directing the distributed storage to store a data unit of the storage target data that includes data newly found to be duplicate in deduplication and to store a data unit of the storage target data that includes data not deduplicated in deduplication.

* * * * *